Feb. 18, 1964 L. MINTZER 3,121,799

MAGNETIC CORE COUNTER

Filed June 17, 1960

INVENTOR.
LESTER MINTZER

BY Henry L. Hansen

ATTORNEY 3,121,799
MAGNETIC CORE COUNTER

Lester Mintzer, Newton Center, Mass., assignor to Minneapolis-Honeywell Regulator Company, Minneapolis, Minn., a corporation of Delaware Filed June 17, 1960, Ser. No. 36,814
8 Claims. (Cl. 307—88)

A general object of the present invention is to provide a new and improved electrical apparatus useful in the manipulation of digital data. More specifically, the present invention is concerned with a new and improved binary scaler or frequency divider wherein the circuit is implemented using bistable magnetic core devices and associated inactive circuit elements for effecting the desired frequency division or scaling.

In digital control circuitry, it is frequently desirable to provide circuit means for effectively counting input pulses applied to the circuit means and producing an output pulse in accordance with some predetermined scale factor or sub-multiple of the input pulse rate. Of the input signals, it has been found that magnetic core devices of the bistable type are particularly adapted for use in digital manipulation circuitry. These bistable magnetic core devices have been adapted, as described herein, for application to a scaler or frequency division circuit in such a manner that the only active element in the entire combination is the input signal source. The circuitry has further been implemented in such a manner that no special bias or shift signal sources are required in the circuit in order to effect the operation thereof.

It is accordingly a further object of the present invention to provide a new and improved magnetic binary scaler.

A further object of the invention is to provide a new and improved magnetic core binary scaler wherein the only active element in the scaler circuitry is an input pulse source.

A still further object of the present invention is to provide a new and improved binary scaler circuit utilizing a plurality of magnetic core devices each of which has a pair of input windings, one of which is adapted to be controlled by a signal derived from a pulse source, while the other input winding is adapted to be controlled by a signal derived from a delay network which is also connected to the pulse source.

Still another object of the invention is to provide a new and improved pulse handling circuit using a bistable magnetic core device having a pair of input windings, one of which is adapted to be driven directly by a constant voltage pulse source to switch the core device to one bistable state and the other of which is adapted to switch the core to the opposite bistable state when driven by a signal derived indirectly from the pulse source.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
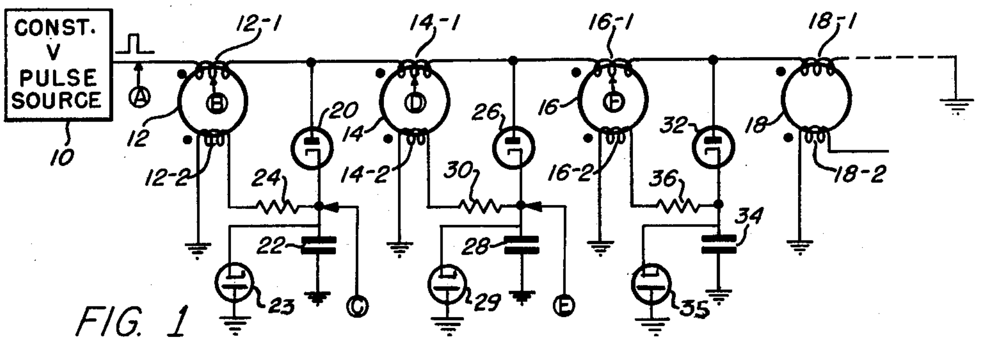
Figure 2:
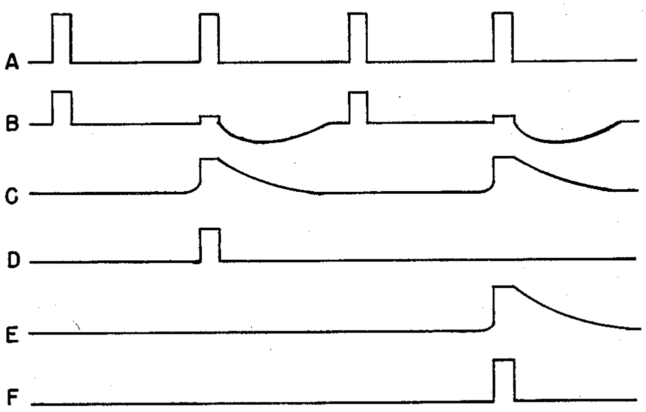

Of the drawings:

FIGURE 1 represents a schematic representation of one form of the invention; and FIGURE 2 illustrates representative wave forms associated with the circuitry of FIGURE 1.

Referring first to FIGURE 1, the numeral 10 identifies a pulse source which is adapted to supply the input pulses from the circuitry of the present invention. The pulse source is assumed here to be a constant voltage pulse source. The output pulses from the constant voltage pulse source 10 is adapted to be applied to a series of input windings on a plurality of bistable magnetic core devices 12, 14, 16 and 18. The input windings driven directly by the source 10 are identified by the numerals 12–1, 14–1, 16–1 and 18–1. A further input winding is provided on each of the core devices and these windings are the windings 12–2, 14–2, 16–2 and 18–2.

A special control circuit is provided for each of the second input windings of each of the core devices, and this control circuit for the core device 12 comprises a diode 20 and a condenser 22 connected in a series circuit between ground and the junction point between the windings 12–1 and 14–1. A diode 23 is connected in parallel with the condenser 22. A resistor 24 couples the junction point between the diode 20 and the condenser 22 to the winding 12–2.

A similar control circuit is associated with the core device 14, and this control circuit comprises a diode 26 connected in series with a condenser 28 having a diode 29 in parallel therewith. A further resistor 30 is connected between the junction of the diode 26 and the condenser 28 to the second input winding 14–2.

A still further control circuit is associated with the core device 16 and its second input winding 16–2. This control circuit similarly comprises a diode 32, condenser 34 having a diode 35 in parallel therewith, and a resistor 36.

Considering the operation of the circuit illustrated in FIGURE 1, it is assumed that the input constant voltage source is providing a series of control pulses such as indicated at FIGURE 2A. These control pulses need not be uniformly spaced as indicated in FIGURE 2A, but should not occur more frequently than the time constants associated with the RC networks on the input of the second input winding of each core device.

It is assumed at the outset that each of the core devices 12, 14, 16 and 18 are in a reset state. Further, the polarity of the input pulses and the polarity of the input windings 12–1, 14–1, 16–1 and 18–1 are assumed to be such as to reset the respective core devices. If all of the core devices are in the reset state when the first constant voltage pulse is applied from the source 10, the input windings 1 associated with each of the core devices will appear as a low impedance. Consequently, the application of the input pulse will be effective to cause the associated diodes in the outputs to conduct and charge their respective condensers. Thus, with the winding 12–1 appearing as a low impedance, the application of the input voltage pulse will cause the diode 20 to conduct and the condenser 22 to be charged such that its upper terminal is positive with respect to the grounded terminal. As soon as the input voltage pulse has disappeared, the charge on the condenser 22 will discharge through the resistor 24 by way of the second input winding 12–2. This discharge current will set the core device 12.

In a manner similar to that described above, the application of the constant voltage input pulse will also be effective to cause the diodes 26 and 32 to conduct and charge their associated condensers 28 and 34 respectively. These condensers will also discharge upon the disappearance of the input pulse and will be effective by way of the respective resistors 30 and 36 to set the core devices 14 and 16 respectively.

Once all of the core devices are in the set state, the next input pulse will be effective to reset only the core device 12. In this regard, it will be noted that with the core device 12 in a set state, the application of an input voltage pulse to the winding 12–1 will tend to switch the core. Consequently, the input winding 12–1 will appear as a relatively high impedance so that most of the voltage drop of the input pulse will appear directly across the input winding. Inasmuch as the core is tending to switch, there will be a voltage induced in the other input winding 12–2. The number of turns on this particular winding, however, will be less than those on the input winding 12–1 such that the resultant voltage appearing on the winding 12–2 will be less. The net effect of this is to have the input pulse create a current flow circuit through the winding 12–1, diode 20, resistor 24, and winding 12–2 to ground. There will also be a tendency for the input signal to charge the condenser 22. However, due to the back voltage produced within the winding 12–2, the net voltage appearing at the lower terminal of the diode 20 will be relatively small, and the resultant charge on the condenser will be insufficient to effect any circuit operation. The voltage appearing across the winding 12–1 will be as represented in FIGURE 2B. In view of the large voltage drop across the input winding 12–1, there will be negligible voltage drop across the windings 14–1, 16–1 and 18–1. Consequently, the core devices 14, 16 and 18 will not be switched.

As soon as the next input puse is received, the pulse will see a relatively low impedance at the winding 12–1 so that, in effect, the full voltage will be applied to the upper terminal of the diode 20. The effect of this voltage will be to cause the diode 20 to conduct and to charge the condenser 22. The presence of the full voltage on the upper terminal of the diode 20 will also be effective to apply the full voltage across the input winding 14–1 of the core device 14. The charging of the condenser 22 is represented by the curve illustrated in FIGURE 2C. The voltage appearing on the input winding 14–1 will be as represented in FIGURE 2D. The core device 14 will then be switched from the set state to the reset state in a manner comparable to the manner in which the core device 12 was switched to the reset state. As soon as the input pulse disappears, the charge on the condenser 22 will begin to dissipate through the resistor 24 and the input winding 12–2 so that now the core device 12 will be switched back into the set state.

The next incoming pulse from the pulse source 10 will then have to switch the core device 12 back into the reset state as described above. With the core devices 12 and 14 both being switched into the reset state, the next input pulse, or the fourth input pulse in this series, will be effective to charge the respective condensers 22 and 28. The charging curves are as indicated in FIGURES 2C and 2E. At the same time, the full voltage of the pulse source 10 will appear across the input winding 16–1, as indicated at F in FIGURE 2. It will be apparent that the condensers 22 and 28, when charged by this fourth input pulse, will discharge through the respective input windings 12–2 and 14–2 to switch the respective core devices 12 and 14 back into the set state. The next input pulse will then be effective to act only on the input core device 12 and the sequencing will continue on down the chain in the manner described above. It will be apparent that as soon as the core devices 12 and 14 are once again switched into the reset state, while the core 16 is in the reset state, the next succeeding pulse will be effective to switch the core device 18 and to simultaneously charge the condensers 22, 28 and 34 associated with the respective core devices 12, 14 and 16.

The diodes 23, 29 and 35 are used to prevent negative excursions of the condensers 22, 28 and 34 which might otherwise tend to cause a partial setting of the succeeding cores.

It will be seen from the foregoing description that the scaler that has ben provided is actually a binary scaler in that the scaling effected by way of the core device 12 is $2^1$. The scaling effected by way of the core device 14 is $2^2$, while the scaling effected by way of the core device 16 will be $2^3$. Similarly, the scaling effected by way of the core device 18 will be $2^4$.

It will be further readily apparent that the scaling circuit described herein is an extremely simple one in that it requires but a single input active pulse source for effecting all of the desired control action within the scaling circuit. Consequently, the amount of power required or dissipated will be derived from a single source and will be required only at the time that the input pulses appear. It will be further readily apparent that eliminating the need for any active elements within the scaler circuit itself increases the inherent reliability of the circuit to a degree far beyond that which can be achieved in other known types of scaling circuitry.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure a Letters Patent is:

1. A frequency divider comprising a plurality of magnetic core devices each having a first and a second winding, a constant voltage pulse source, means connecting each of said first windings in a series circuit to said pulse source, a diode means connected to said series circuit at each junction between said first windings, a separate condenser individually connected in series with each of said diode means, and means connecting the second winding of each core device to the junction of its corresponding condenser and diode means.

2. A frequency divider comprising a plurality of magnetic core devices each having a first and a second winding, a constant voltage pulse source, means connecting each of said first windings in a series circuit to said pulse source, a diode means connected to said series circuit at each junction between said first windings, a separate condenser connected in series with each of said diode means, and resistance means connecting the second winding of each core device to the junction between said condenser and said diode means.

3. A frequency divider comprising a plurality of magnetic core devices each having a first and a second winding, a constant voltage pulse source, means connecting each of said first windings in a series circuit to said pulse source, a diode means connected to said series circuit at each junction between said first windings, a condenser connected at one terminal in series with each of said diode means and at the other terminal to a common voltage reference point, and means connecting one end of the second winding of each core device to the junction between said condenser and said diode means and the other end of said second winding to said common voltage reference point.

4. A binary scaler comprising a constant voltage pulse source, a plurality of bistable magnetic core devices, each of said core devices having a first input winding adapted to switch the associated core device to one of its bistable states and a second input winding adapted to switch the associated core device to the other of its bistable states, means connecting the first input windings of each of said core devices in a first series circuit to said pulse source, and a separate control circuit individually connected to each of said second input windings, each of said control circuits comprising a condenser and a diode connected in a second series circuit conductively coupled to said first series circuit through a common junction point.

5. A binary scaler comprising a constant voltage pulse source, a plurality of bistable magnetic core devices, each of said core devices having a first input winding adapted to switch the associated core device to one of its bistable states and a second input winding adapted to switch the associated core device to the other of its bistable states.

means connecting the first input windings of each of said core devices in a first series circuit to said pulse source, and a separate control circuit connected to each of said second input windings, each of said control circuits comprising a diode and a resistor connected in a second series circuit with said second input winding, said first and second series circuits being conductively connected to a common junction point, and a condenser connected in parallel with said second input winding and said resistor.

6. A binary scaler comprising a constant voltage pulse source, a plurality of bistable magnetic core devices, each of said core devices having a first input winding adapted to switch the associated core device to one of its bistable states and a second input winding adapted to switch the associated core device to the other of its bistable states, means connecting the first input windings of each of said core devices in a first series circuit to said pulse source, and a separate control circuit corresponding to each of said second input windings and individually connected thereto, each of said control circuits comprising a diode and a time delay circuit conductively connected to said first series circuit through a common junction point.

7. A magnetic core circuit comprising a plurality of bistable magnetic core devices each having at least two input windings, one of said windings being adapted to set said core device to one bistable state and the other winding being adapted to reset said core device to the other bistable state, a constant voltage pulse source connected only to said one input winding of respective ones of said core devices, a diode, a condenser and a resistor individually associated with each of said core devices, means including said diode connecting said condenser in a charging circuit to said input pulse source, and means including said resistor connecting said condenser in a discharge circuit through said other input winding.

8. A magnetic core circuit comprising a plurality of bistable magnetic core devices each having at least a pair of separate, independently connected input windings, one winding of each of said pairs being connected in a common series circuit and being adapted to set its corresponding said core device to one bistable state, the other winding of each of said pairs being adapted to reset said core device to the other bistable state, a constant voltage pulse source connected only to said one input winding of each of said core devices, a diode, a condenser and a resistor individually associated with each of said core devices, means including said diode connecting said condenser in a charging circuit to said input pulse source, and means including said resistor connecting said condenser in a direct series discharge circuit with said other input winding.

References Cited in the file of this patent

UNITED STATES PATENTS

| | | |
|---|---|---|
| 2,800,596 | Bolie | July 23, 1957 |
| 2,900,529 | Weiner | Aug. 18, 1959 |
| 2,930,029 | Moore | Mar. 22, 1960 |
| 2,935,735 | Kodis et al. | May 3, 1960 |
| 2,953,775 | Newhouse | Sept. 20, 1960 |